UNITED STATES PATENT OFFICE.

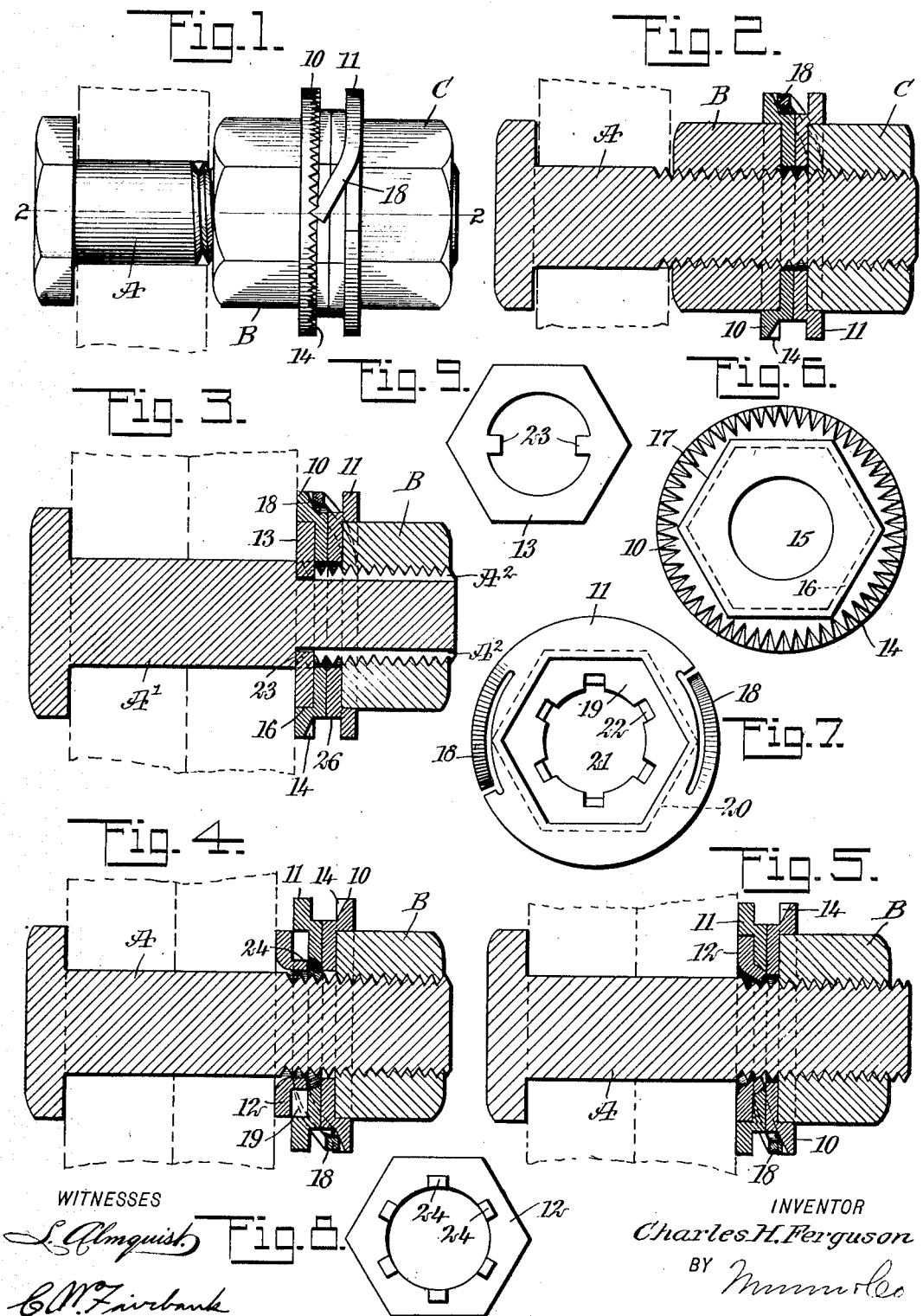
C. H. FERGUSON.
NUT LOCK.
APPLICATION FILED OCT. 22, 1908.
913,486.
Patented Feb. 23, 1909.
INVENTOR
Charles H. Ferguson

CHARLES H. FERGUSON, OF JERSEY CITY, NEW JERSEY.

NUT-LOCK.

No. 913,486.

Specification of Letters Patent.

Patented Feb. 23, 1909.

Application filed October 22, 1908. Serial No. 459,081.

*To all whom it may concern:*

Be it known that I, CHARLES H. FERGUSON, a citizen of the United States, and a resident of Jersey City, in the county of Hudson and State of New Jersey, have invented a new and Improved Nut-Lock, of which the following is a full, clear, and exact description.

This invention relates to certain improvements in nut locks, and more particularly to a special construction whereby an ordinary nut may be locked to an ordinary bolt or to a second nut, without necessitating any changes whatsoever in the construction of either the nut or bolt.

My improved mechanism involves two plates and a washer, which when properly adjusted, serve, in connection with the bolt and nut, to perform all of the functions of an ordinary nut lock.

The device may be employed for locking a nut to a plain threaded bolt or to a bolt having a splineway, or two nuts may be locked together but independently of a direct locking action on the bolt.

Reference is to be had to the accompanying drawings forming a part of this specification, in which similar characters of reference indicate corresponding parts in all the figures.

Figure 1 is a side elevation of a bolt provided with my improved nut locking means, the mechanism being employed to lock together two nuts; Fig. 2 is a longitudinal section of the device shown in Fig. 1; Fig. 3 is a longitudinal section through my improved device when used for locking a nut to a splined bolt; Fig. 4 is a longitudinal section through my improved device, showing it employed for securing a nut to an ordinary bolt, the parts being in the position occupied before the nut is tightened; Fig. 5 is a view similar to Fig. 4 but showing the nut in a tightened position; Figs. 6 and 7 are face views of the two plates employed in my nut lock; Fig. 8 is a face view of a washer adapted for use in connection with an ordinary bolt; and Fig. 9 is a face view of a washer adapted for use in connection with a splined bolt.

For performing all of the functions of which my nut lock is capable, I provide four separate pieces, including two plates 10 and 11 and two washers 12 and 13. The two plates may be used together without either washer or may be used in connection with either washer, depending upon the conditions under which the nut lock is used. The plate 10 is substantially circular in form and is provided with a series of pointed teeth 14 upon one face thereof and disposed adjacent the periphery. This plate has a central aperture 15 to receive the bolt, and in the face of said plate opposite said teeth is a recess 16, preferably hexagonal in form and of uniform depth. The recess may be formed by stamping, in which case there will be a projection 17 similar in form to the recess and extending outwardly from the opposite side of the plate so that the peripheral portion will constitute a flange. The teeth 14 are cut in this flange and extend partly into the face opposite to the recess and partly into the circumferential face, but do not extend all the way through the plate; thus they are protected against injury or against being broken off by careless or rough treatment. The plate 11 is also circular and of substantially the same diameter as the plate 10, and adjacent the periphery are two spring tongues 18 stamped from the material forming the plate and bent out of the plane of the plate. These tongues are cut at their ends so as to fit the teeth of the opposite plate, as shown particularly in Fig. 1, and the resiliency of the tongue is such that when the plates are brought into engagement with each other, the tongues will engage with the teeth with considerable pressure. The plate 11 is provided with a recess 19 similar to the recess 16, and as this recess is preferably formed by stamping there is a corresponding projection 20 extending outwardly from the opposite side of the plate. The plate has a central aperture 21 to receive the bolt, and about this aperture are provided a series of notches 22 spaced equal distances apart and extending wholly or partially through the plate. The inner surface of each notch is inclined, as illustrated particularly in Figs. 4 and 5, so that each notch is deeper at the side of the plate having the recess 19 than it is at the opposite side of the plate. The two main recesses 16 and 19 of the two plates are of such a size and form as to receive the ends of two nuts or to receive the washers 12 and 13.

If it is desired to lock together two nuts on a bolt the parts may be assembled substantially as shown in Figs. 1 and 2. In these figures I have shown an ordinary bolt A and two ordinary nuts B and C. One of these nuts is screwed onto the bolt to the desired distance and the plate 10 is slipped onto the bolt until the nut B enters the recess 16 in the plate. The plate 11 is then slipped onto the bolt and the nut C is screwed on and fitted into the recess in the plate 11. The plate 10 is now held against rotation in respect to the nut B and the plate 11 is held against rotation in respect to the nut C. By tightening the nut C the two plates are rotated in respect to each other until they come closely together, and the tongues 18 will have resilient engagement with the teeth 14 and the two nuts will become wedged together, so that one cannot rotate independently of the other.

In case it is desired to lock a single nut on the bolt and in case the bolt is provided with a spline-way or groove, I use in connection with the two plates 10 and 11 the washer 13, as shown in Fig. 9. This washer is of such size and thickness that it may enter the recess in either of the plates and lie flush with the outer surface thereof. The washer has one or more inwardly projecting lugs 23 which may enter the spline-ways of the bolt. When the washer 13 is used the parts are assembled substantially as shown in Fig. 3, in which figure I have illustrated a bolt A′ having two spline-ways or longitudinal grooves A² and a single ordinary nut B. The washer 13 is first placed on the bolt with the lugs 23 entering the spline-ways and the washer is brought against the shoulder on the bolt or against the material through which the bolt passes. The plate 10 is then placed in position with the washer 13 in the recess of the plate, and the plate 11 and the nut B are placed on the bolt with the nut entering the recess of the plate. Upon tightening the nut the engagement of the tongues 18 with the teeth will prevent loosening of the nut, as the nut cannot turn in respect to the plate 11, the plate 11 cannot turn in respect to the plate 10 and the latter is held against rotation in respect to the bolt by the washer 13.

In case it is desired to employ my improved device on a bolt having no spline-way, I employ a washer 12, as shown in Fig. 8. This washer is of the same size and thickness as the washer 13, but instead of being provided with inwardly-extending lugs 23, it is provided with longitudinally-extending lugs 24, disposed about the central aperture in the washer. These lugs correspond in number and position to the recesses 22 of the plate 11 and are of a length substantially equal to the thickness of the plate 11 and of a thickness substantially equal to the depth of the recesses 22 at their larger ends. In using this washer the parts are assembled substantially as shown in Figs. 4 and 5. The washer 12 and the plates 11 and 10 are placed on the bolt in the order named and the nut B is turned to position with the inner end thereof extending into the recess of the plate 10. As the nut is tightened the plate 10 is rotated with the nut and the teeth travel over the tongues 18. The plate 11 is forced onto the washer 12 and the projections 24 enter the recesses 22. Due to the inclined inner surfaces of these recesses, the forcing of the washer and the plate together causes the lugs to be bent inwardly into engagement with the thread of the bolt, so as to become partially mutilated or to partially mutilate the threads of the bolt. When the nut has been tightened to position, the parts will occupy substantially the position shown in Fig. 5. The nut and the two plates are locked together and the plate 11 is locked to the bolt by the wedging action of the lugs 24 against the threads.

The main advantage of my improved nut lock is that it may be used in connection with an ordinary bolt and an ordinary nut, and no changes whatsoever are required in either.

The device may be used for various different purposes, and works equally well with bolts having spline-ways or those without spline-ways.

Having thus described my invention, I claim as new and desire to secure by Letters Patent:

1. A nut lock, including a plate having a non-circular recess in one face thereof and a peripheral flange in the plane of the face of the plate having said recess, said flange having a series of notches cut therein partly in the face opposite to said recess and partly in the circumferential face, so as to form a plurality of teeth and leave a part of the peripheral face unbroken, a second plate having a non-circular recess in one face thereof and having a peripheral flange lying in the plane of the face having said recess, a portion of said flange being cut to form a tongue disposed out of the plane of the remainder of the flange and adapted to engage with the teeth of the first-mentioned plate to prevent relative rotation of said plates when said plates are adjacent to or in engagement with each other, and members adapted for entry within said recesses and held against relative rotation by said plates.

2. The combination with a nut and a bolt, of two plates each having a non-circular recess in one face thereof, a washer for engagement in the recess of one of said plates for locking said plate to the bolt, and the recess in the other of said plates being adapted to receive the nut to hold said last-mentioned plate and nut against relative rotation, and means for restricting the rotation of one plate in respect to the other.

3. A nut lock, comprising a plate having a non-circular recess in one face thereof and a series of teeth in the opposite face, a second plate having a non-circular recess in one face thereof and a tongue extending outwardly from the opposite face to engage with the teeth of the first-mentioned plate, and a washer adapted to fit within the recess of one of said plates to lock the latter to the bolt, and the recess of the other of said plates being adapted to receive the nut to hold said last-mentioned plate and the nut against relative rotation.

4. A nut lock, comprising a plate having a recess in one face thereof and having a central aperture to receive a bolt, a plurality of smaller recesses about said central aperture, a washer adapted to enter within said first-mentioned recess and having outwardly-extending lugs or projections adapted to enter said smaller recesses, a second plate adapted for engagement with the first-mentioned plate, means for retarding the relative rotation of the plates, and a nut for engagement with the last-mentioned plate, and means for holding the nut against rotation in respect to the plate.

In testimony whereof I have signed my name to this specification in the presence of two subscribing witnesses.

CHARLES H. FERGUSON.

Witnesses:
ANNA D. FERGUSON,
ANTHONY DUYER, Jr.